(12) United States Patent
Schneider

(10) Patent No.: US 7,669,401 B2
(45) Date of Patent: Mar. 2, 2010

(54) METHOD AND DEVICE FOR PRODUCING A CHAIN

(75) Inventor: Toralf Schneider, Triebischtal-Piskowitz (DE)

(73) Assignee: Kabelschelpp GmbH, Siegen (DE)

( * ) Notice: Subject to any disclaimer, the term of this patent is extended or adjusted under 35 U.S.C. 154(b) by 0 days.

(21) Appl. No.: 11/919,156

(22) PCT Filed: Apr. 28, 2005

(86) PCT No.: PCT/DE2005/000779

§ 371 (c)(1),
(2), (4) Date: Jul. 10, 2008

(87) PCT Pub. No.: WO2006/114067

PCT Pub. Date: Nov. 2, 2006

(65) Prior Publication Data
US 2009/0025360 A1 Jan. 29, 2009

(51) Int. Cl.
*B21L 17/00* (2006.01)
*F16G 13/00* (2006.01)
(52) U.S. Cl. .................. 59/35.1; 59/8; 59/78
(58) Field of Classification Search ............ 59/4, 59/7, 8, 35.1, 78, 78.1
See application file for complete search history.

(56) References Cited

U.S. PATENT DOCUMENTS

| | | | | |
|---|---|---|---|---|
| 2,983,158 A * | 5/1961 | Hodlewsky | ........................ | 59/8 |
| 3,802,184 A * | 4/1974 | Brown et al. | ..................... | 59/7 |
| 3,943,702 A * | 3/1976 | Lacombe-Allard | ............... | 59/4 |
| 4,941,316 A * | 7/1990 | Bechtold | ........................ | 59/78 |
| 6,161,373 A | 12/2000 | Heidrich et al. | | |
| 6,173,560 B1 * | 1/2001 | Weber | ......................... | 59/78.1 |
| 6,318,063 B1 * | 11/2001 | Komiya et al. | ................ | 59/78.1 |
| 6,553,751 B2 * | 4/2003 | Weinberg | ..................... | 59/35.1 |
| 6,615,573 B2 * | 9/2003 | Blase | ........................ | 59/78.1 |

(Continued)

FOREIGN PATENT DOCUMENTS

DE 950 765 10/1956

(Continued)

OTHER PUBLICATIONS

Translated Description and Claims in English language of DE 950 765, European Patent Office's esp@cenet.com database, 4pp.

(Continued)

*Primary Examiner*—David B Jones
(74) *Attorney, Agent, or Firm*—Smith Law Office

(57) ABSTRACT

The invention relates to a method and device for producing a chain composed of chain links and of connecting elements. According to the invention, the chain can be produced in an essentially continuous manner whereby largely eliminating the need to make separating cuts and enabling the production of loadable and durable articulated connections of chain links. To this end, the invention provides that: connecting elements each having two holes are used; the connecting elements are inserted in cavities in first tools, and; chain links are produced with contact at least to partial areas of connecting elements. Inside the holes, joint pins are produced that are a part of the chain links. The invention also relates to a method and device for producing a chain, which is composed of chain links and of connecting elements, made of shapeable materials, particularly plastic.

23 Claims, 9 Drawing Sheets

U.S. PATENT DOCUMENTS 7,017,328 B2 * 3/2006 Komiya et al. ............... 59/78.1

FOREIGN PATENT DOCUMENTS

| DE | 197 10 489 A1 | 9/1998 |
|---|---|---|
| DE | 100 17 514 A1 | 10/2001 |
| DE | 10 2004 027 268 A1 | 11/2005 |

OTHER PUBLICATIONS

English language Abstract, and Translated Description and Claims of DE 10 2004 027 268 A1, European Patent Office's esp@cenet.com database, 6pp.

English language Abstract, and Translated Description and Claims of DE 100 17 514 A1, European Patent Office's esp@cenet.com database, 5pp.

Form PCT/IB/338, Notification of Transmittal of Copies of Translation of the International Preliminary Report on Patentability received Nov. 19, 2007, 1p.

Form PCT/IB/373, International Preliminary Report on Patentability received Nov. 19, 2007, 1p.

Form PCT/ISA/237, Written Opinion of the International Searching Authority (translated) received Nov. 19, 2007, 7pp.

* cited by examiner

METHOD AND DEVICE FOR PRODUCING A CHAIN

FIELD AND BACKGROUND OF THE INVENTION

The present invention relates to a method and a device for producing a chain which comprises chain links 2 and connecting elements 1, made from formable materials, in particular from plastic.

The invention is preferably used for the substantially continuous production of energy guiding chains, proceeding from at least one injection molded part or extruded part and with the execution of forming and separating operations. The energy guiding chains which are produced in this way comprise a plurality of links having individual connecting elements, the chains comprising elements which are connected to one another and have, at their ends, two pivots which extend to the outside or two connecting openings, the diameter of which corresponds to the diameter of the pivots, adjacent chain links being connected by the pivots which engage into the connecting openings.

Energy guiding chains, also called energy chains or drag chains, are used to convey flexible lines, in particular supply lines, to a movable or displaceable consumer. These energy guiding chains are composed of a multiplicity of chain links which have a box-shaped profile. At their ends, these chain links have an articulated connection, about which they pivot with respect to one another. Limitation of the angle ensures that the lines which are guided in the energy guiding chain are bent only in a defined bending radius.

Various methods for the production of energy guiding chains are known in the prior art. Here, the individual chain links are usually manufactured as injection molded parts from plastic. Subsequently, a predefined number of chain links are connected to one another to achieve the desired length of the energy guiding chain. At one end, the chain links usually have in each case one pivot on opposite sides of the box profile, while two lug-like projections are provided at the other end, which projections have in each case one opening, the diameter of which corresponds to the diameter of the associated pivot. For connection, the two lugs are bent apart from one another. The lugs are pushed over the two pivots, until the pivots latch into the connecting openings.

One disadvantage here is the complicated multiple-stage production and assembly operation.

According to DE 100 17 514 A1, a method for producing guide chains from plastic is known. These guide chains comprise chain links having a box profile, each chain link having a basic body with pivots and connecting openings, adjacent chain links being connected rotatably by engagement of the pivots into the connecting openings. In this method, first of all a box-shaped extruded part is provided, subsequently articulated connections are produced by forming and/or separating operations which in each case form the outer contour of the pivots. The side walls are separated in each case into an inner and outer part; the outer side part walls are severed. The inner side part walls are severed until finally the upper and lower faces of the box profile are likewise severed.

It is a disadvantage that, in these production steps, a multiplicity of individual parts are required for separating operations, for the execution of which complicated knives having delicate blades are required.

Furthermore, it is known in the prior art to construct single-piece energy guiding systems by first of all elongate components being extruded and the latter subsequently being configured in a plurality of processing steps by mechanical processing such as punching, cutting or bending, in such a way that they can be deflected in predefined radii.

It is a disadvantage here that the articulated connections of said guide chains do not exhibit sufficient flexibility by corresponding cross-sectional change in the extruded body and are therefore at risk of fracture.

It is a disadvantage here that these profiles which are produced continuously require great degrees of freedom with subsequently introduced functions and are susceptible to wear.

According to DE-A1 197 10 489, a method for producing a guide chain is known, which guide chain is also denoted there as a protective element for movably laid lines. In order to produce this protective element, first of all a flat plastic part is injection molded or cast in one piece, which plastic part has segments which are connected to one another by bendable bridges. Each protective element can be compared with a chain link and has a base face, two side faces and an upper face, connected to one another by predetermined bending points, in the form of a band. The individual faces can be folded to form a box-shaped segment, the upper face element being connected by way of the free end to the free edge of one side face segment. Whereas the two side face parts are joined to two opposite sides of the base face element, the individual adjacent base face elements are connected to one another at their other longitudinal sides, with the result that, when the respective face parts which are assigned to the respective base faces are folded to form a box-shaped element, the respective box-shaped segments (or chain links) are connected via a predetermined bending point on the longitudinal edges of the base faces.

High assembly expenditure is also required in this method, as the individual segments have to be folded from the face elements. Chains of this type have low stability, as the box-shaped profile ensures only low dimensional stability in the region of the edges, on which the segments are folded. Finally, the predetermined bending points which are produced by the reduction in the material thickness are also subjected to the risk of fracture on account of material fatigue phenomena during the use of the guide chain.

According to DE-A1 197 10 489, the side face segments are to be provided with articulated parts in the form of pivots and guide holes, with the result that the joint parts of respectively adjacent links engage into one another after the folding of individual segment parts.

It is also a disadvantage in this method that complex folding of the individual box-shaped profiles is performed.

SUMMARY OF THE INVENTION

The present invention is based on the object of specifying a method and a device for producing a chain which comprises chain links and connecting elements, in which the chains which are produced can be produced substantially continuously, separating cuts being largely dispensable and it being possible for loadable and long-term articulated connections of chain elements to be produced.

The invention has a number of advantages. In particular, additional method steps for joint production are dispensable, as pivots can be produced directly in corresponding cutouts by injection molding or similar method steps. The production of reliable articulated connections is achieved by the use of cutouts having an undercut.

It is advantageous that cutouts and corresponding pivots can be produced both on connecting elements and on chain links.

The application of release agents to the connecting elements and/or at least part regions of first dies or to connecting elements and/or to the dies, into which the connecting elements can be inserted, and/or to a core element makes it possible to prevent an adhesive connection between preassembled connecting elements of the chain and the chain links which are to be produced newly, and to ensure sliding of the newly produced chain links on the core element.

The formation of cutouts as an undercut makes it possible to produce rotatable pivots in the direction of their rotational axis in reliable contact with the cutouts and directly in the cutouts.

The production of stops makes a defined limitation possible of the rotation between connecting elements and chain links, by which in each case a rolling radius of the chain can be fixed for each rolling direction.

The arrangement of a core element in a hollow space for the production of chain links, the hollow space being formed in a region of corresponding chain dies with corresponding receiving elements, makes it possible, as a result of the generation of an inner space in the manufactured chain links, for chain links to be produced which are suitable for receiving energy conductors.

The invention will be explained in greater detail in the following text using exemplary embodiments.

DETAILED DESCRIPTION OF PREFERRED EMBODIMENTS

Figures 1, 2:
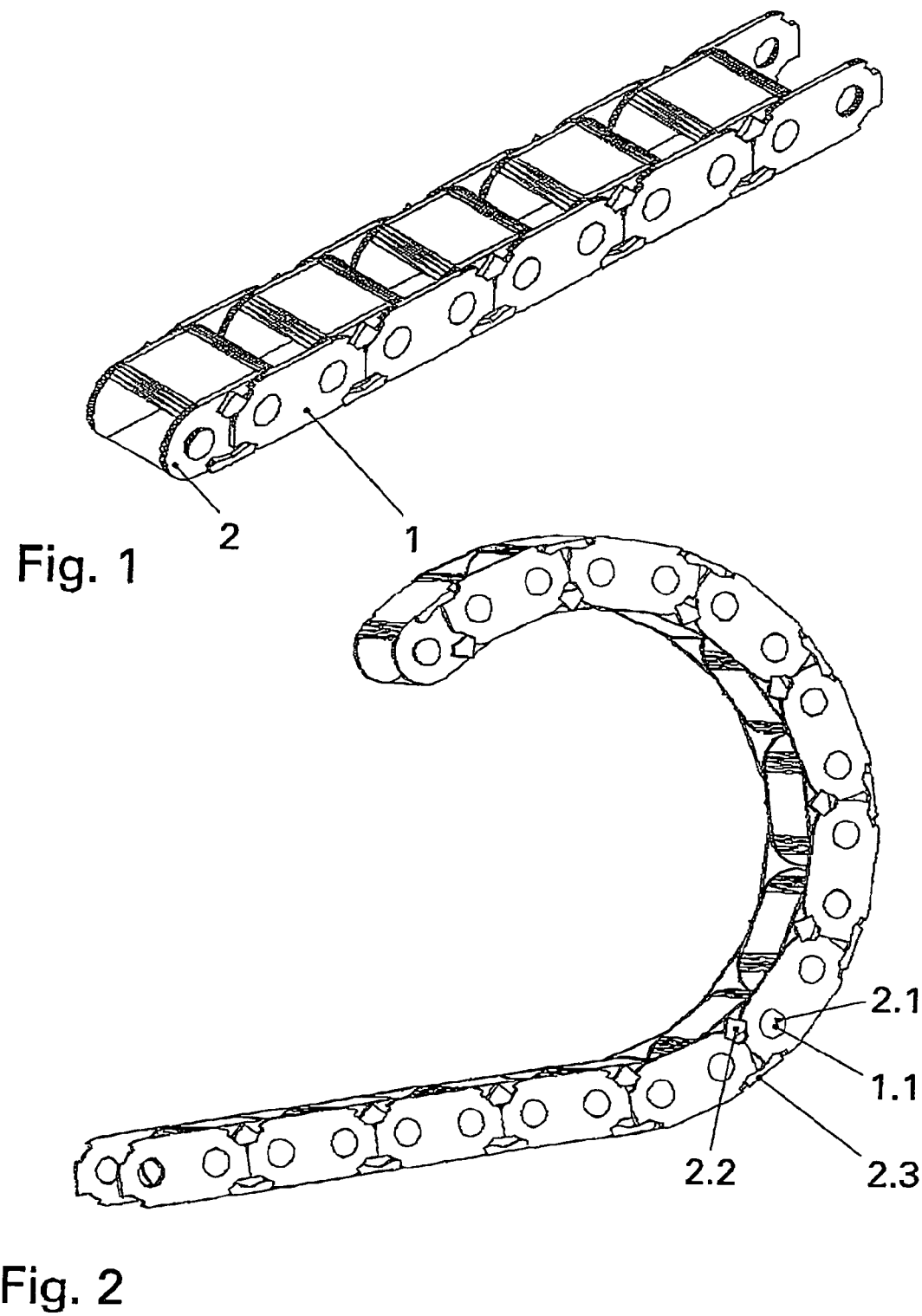
FIG. 1 shows a perspective view of one embodiment of a chain according to the invention in a stretched position.
FIG. 2 shows the view of said chain in a rolled position.

In the view which is shown in FIG. 1, an energy guiding chain is shown in a stretched position. This energy guiding chain comprises identical chain links 2, two respectively adjacent chain links 2 being connected by way of in each case two connecting elements 1. The chain links 2 are configured substantially in the shape of hollow boxes and are suitable for receiving lines.

FIG. 2 shows this energy guiding chain in the partially rolled state. The connecting elements 1 have in each case two cutouts 1.1 of circular configuration which interact operatively with pivots 2.1 which are arranged on the lateral regions of the chain links 2. The pivots 2.1 and the cutouts 1.1 together form joints, the rotatability of each joint being delimited as an alternative by upper stops 2.2 and lower stops 2.3 which are likewise arranged on the lateral elements of the chain links 2. Here, the lower delimiting is carried out by the lower stops 2.3 in such a way that a substantially stretched position of the chain results. The upper delimiting takes place in such a way that a defined predetermined rolling radius for the chain is maintained and not undershot.

Figure 3A:
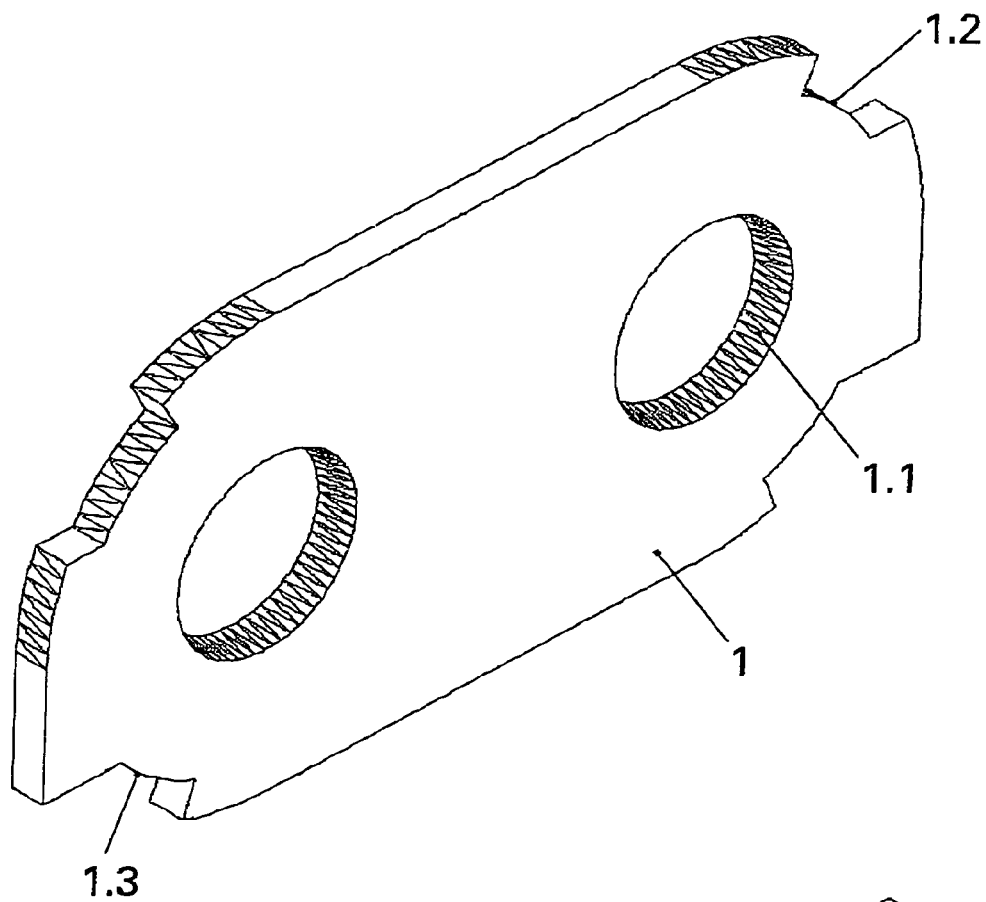
FIG. 3a shows a perspective view of one embodiment of a connecting element.

FIG. 3a shows a perspective view of a connecting element 1 of the chain according to FIGS. 1 and 2. This connecting element 1 has two substantially frustoconical cutouts 1.1, the diameter of the cutouts 1.1 on the outer side of the connecting elements 1 being greater than the diameter on the corresponding inner side. Upper recesses 1.2 are arranged at the upper ends of the connecting element 1; in each case one lower recess 1.3 is arranged in the lower region of the two ends of the connecting element 1. The recesses 1.2 and 1.3 serve to delimit the rotation of the joints of the chain, in an operative unit with upper and lower stops 2.2 and 2.3 on the chain links, and therefore to define a predetermined minimum radius in each rolling direction of the chain.

Figure 3B:
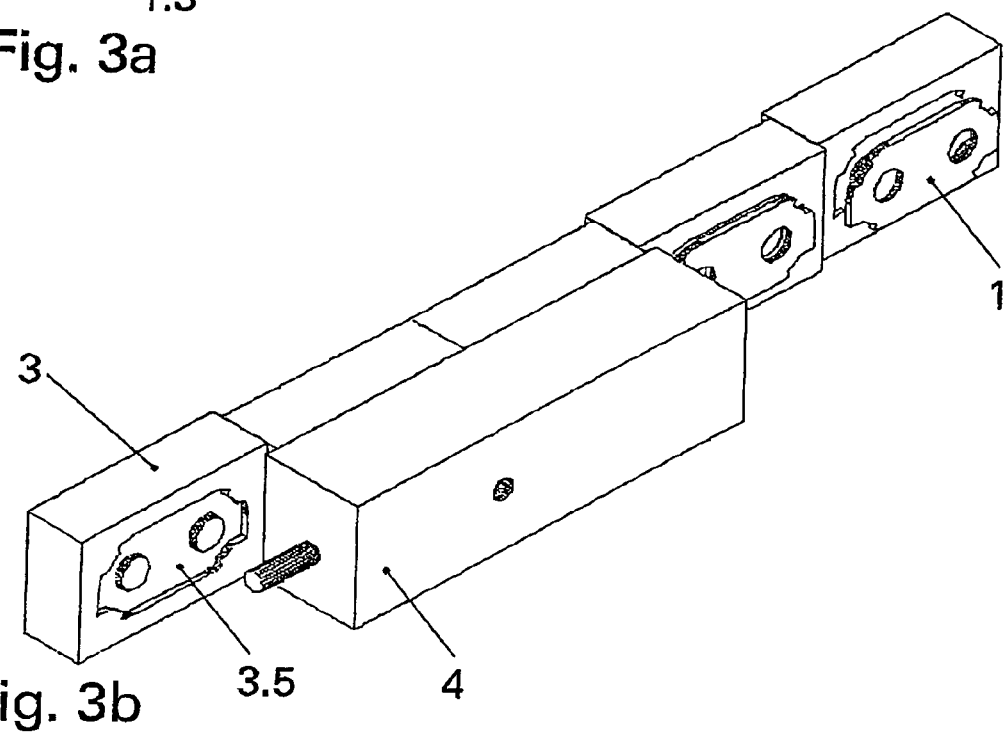
FIG. 3b shows a perspective view of a first embodiment of a device for producing these connecting elements.

FIG. 3b shows a detail of one embodiment of a device for producing the connecting elements 1. This device comprises substantially a plurality of first dies 3 and an extruder nozzle 4. On the side which faces the extruder nozzle 4, the first dies 3 have in each case flat surfaces. Cavities 3.5 which serve as a mold for curable mass to be injected for the production of connecting elements 1 are arranged in said surfaces. The two elevations which are formed in the cavities 3.5 are frustoconical and form the counterpart to the cutouts 1.1 which are to be produced of the connecting elements 1. In this exemplary embodiment, the first dies 3 are guided in each case on both sides past the extruder nozzle 4, the first dies 3 being shown on only one side of the extruder nozzle 4 in this figure.

Figure 3C:
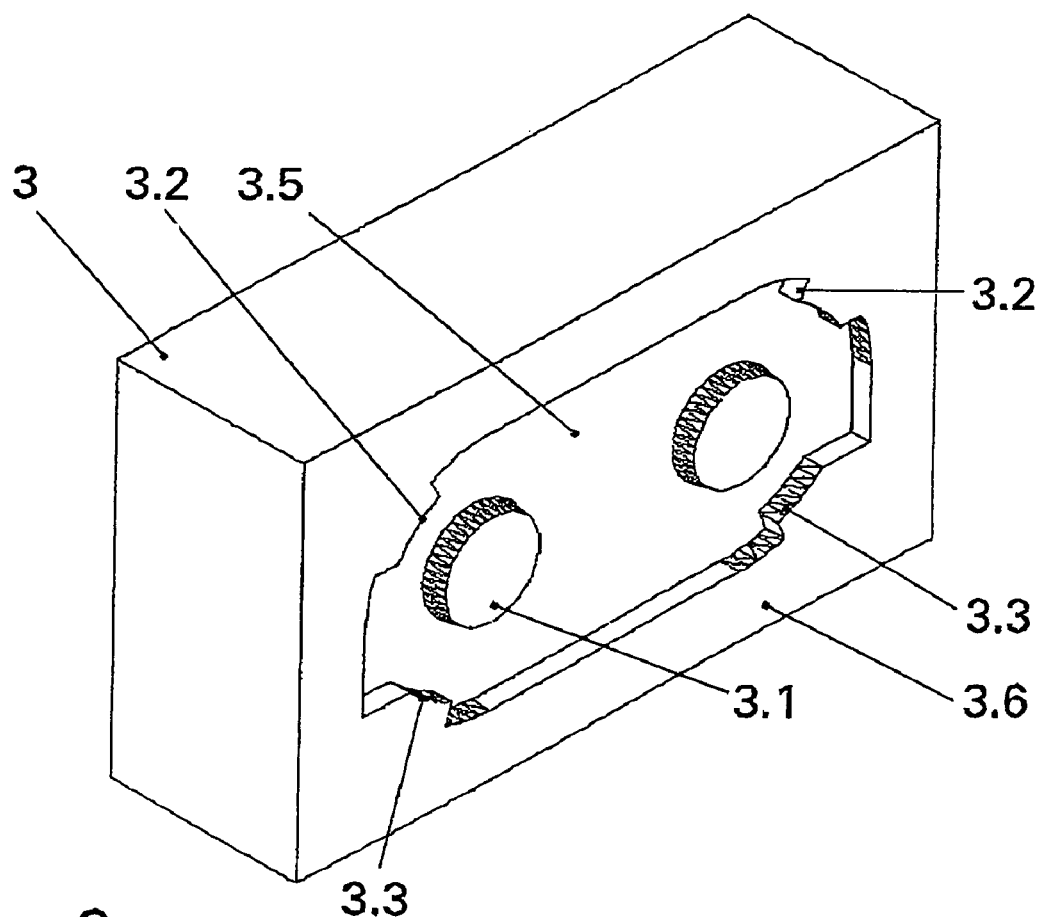
FIG. 3c shows a first detail of said device.

FIG. 3c shows a single first die 3 with the cavity 3.5 which is arranged on the flat inner face 3.6 and in which the frustoconical elevations 3.1 are arranged. The frustoconical elevations 3.1 are of tapering configuration from the base of the cavity 3.5. As a result, the connecting elements 1 which are to be produced in the cavities 3.5 can be removed. Upper projections 3.2 are formed in the upper regions; lower projections 3.3 are formed in the lower regions. The projections 3.2 and 3.3 serve to form the recesses 1.2 and 1.3 of the connecting elements 1 which are to be formed.

Figure 3D:
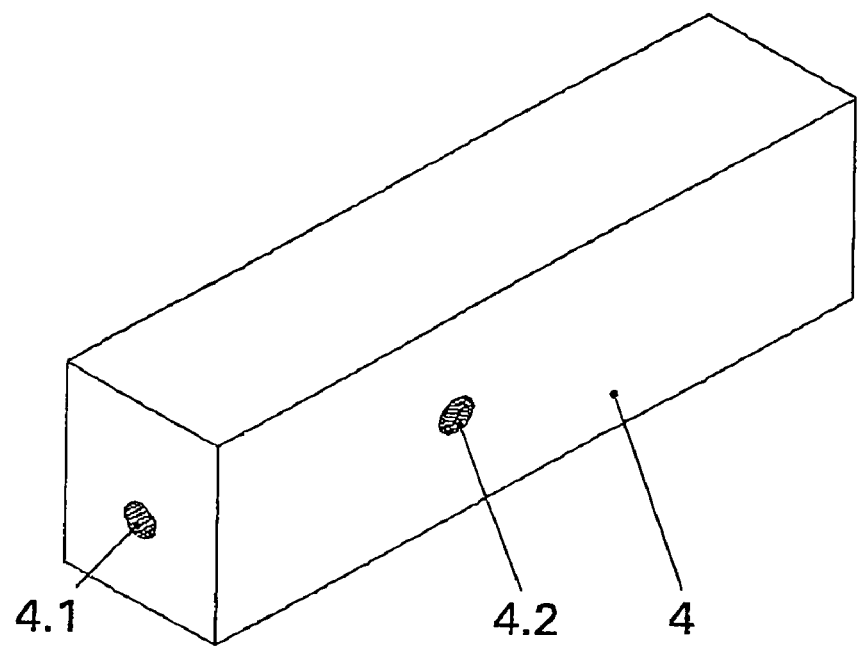
FIG. 3d shows a further detail of said device.

The extruder nozzle which is shown in FIG. 3d is configured with an inlet opening 4.1 and two outlet openings 4.2, only the right-hand outlet opening being shown here. Liquid, curable plastic is fed in via the inlet opening 4.1, which plastic is injected at high pressure through the outlet openings 4.2 in each case into cavities 3.5 of the first dies 3, while the first dies are guided past the extruder nozzle 4 and bear against its side wall, while the cavity 3.5 is guided past next to the outlet opening 4.2. If the inner face 3.6 of the first die 3 is guided past the two faces of the extruder nozzle 4, the outlet opening 4.2 is sealed by the inner face 3.6 of the first die 3 until the next cavity 3.5 reaches the outlet opening.

Figure 3E:
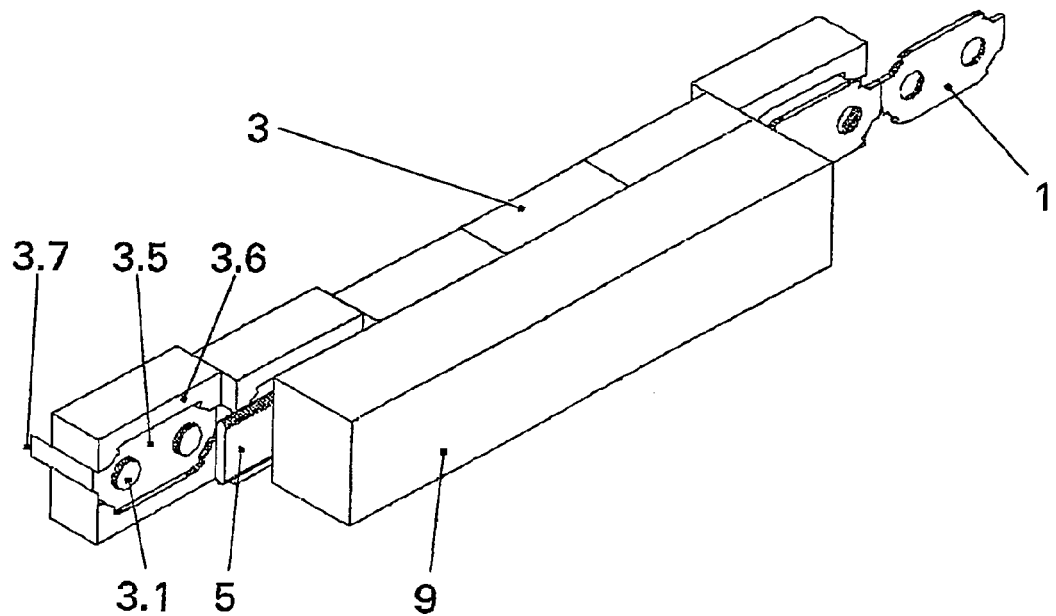
FIG. 3e shows a second embodiment of a device for producing the connecting elements according to FIG. 3a, FIG. 3f shows a first detail of said device.

FIG. 3e shows a second embodiment of the device for producing the connecting elements 1 according to FIG. 3a. In this embodiment, the connecting elements 1 are formed by an extruded material 5 being guided, together with the first dies 3, next to a side face of a counterpart 9 and by the first dies 3 being pressed against the side face of the counterpart 9, with the result that the connecting elements 1 are pressed in the manner of a ram out of the extruded material 5. In the case of the subsequent method sequence, the first dies 3 are guided past with the connecting elements 1 in the cavities 3.5, in each case adjacent, newly produced connecting elements 1 are severed from one another by means of blades 3.7, and subsequently the first dies 3 are guided away from the counterpart 9, with the result that the connecting elements 1 which are severed from one another can be removed from the cavities 3.5.

Figure 3F:
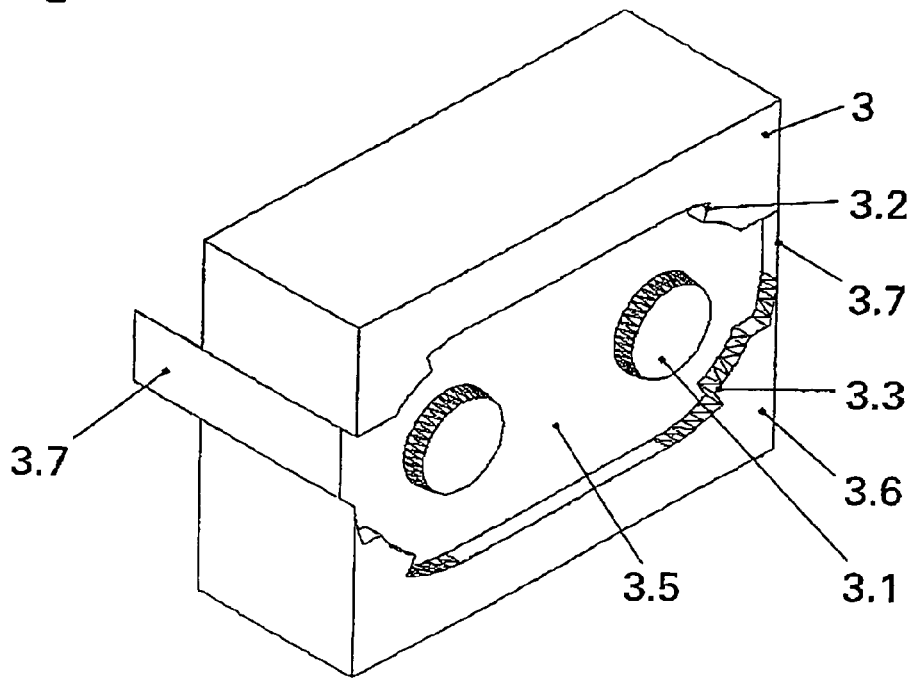
FIG. 3g shows a further detail of said device.
FIG. 3h shows a third embodiment of a device for producing the connecting elements according to FIG. 3a, FIG. 4 shows a perspective view of one embodiment of a chain link.

FIG. 3f shows a single die 3 of the second embodiment according to FIG. 3e. The shape of the connecting elements 1 which can be produced with it is largely identical to the shape of the connecting elements 1 which can be produced with the first die 3 according to FIG. 3c. The cavities 3.5 of this second embodiment of first dies 3 are of open configuration on the lateral edge of this die 3; connecting elements 1 which are produced in an intersecting manner by adjacent first dies 3 are separated from one another with the aid of the blades 3.7.

Figure 3G:
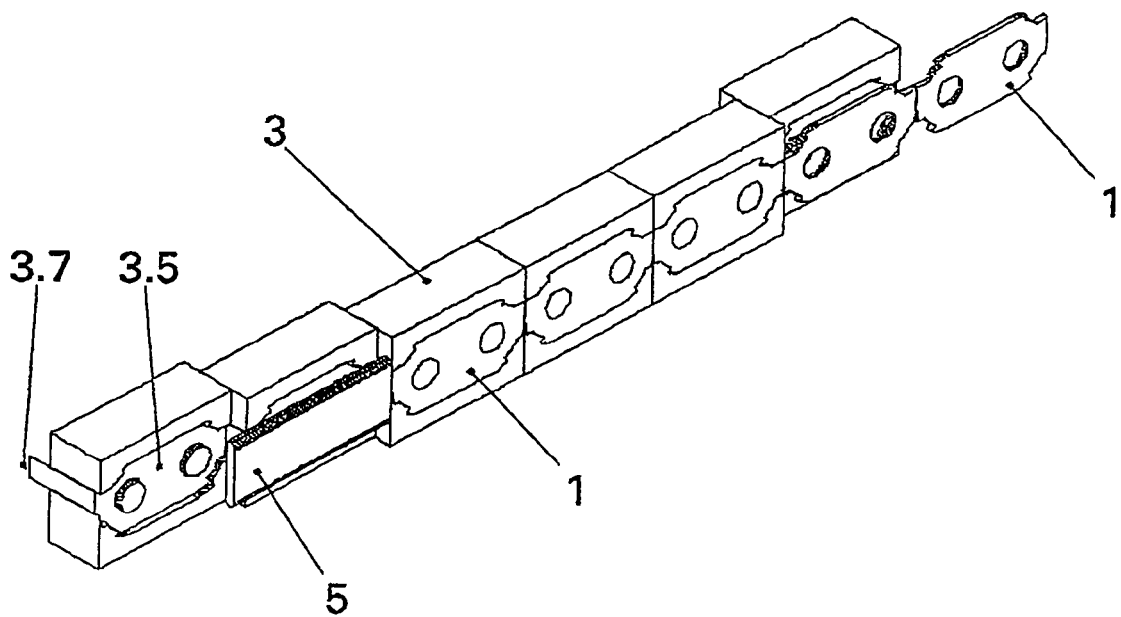

FIG. 3g shows the device according to 3e without the illustration of the counterpart 9. In the illustration which is selected here, the extruded material 5 is shown in the left-hand region, the pressed connecting elements 1 which are still connected to one another are shown in the central region, and the removed connecting elements 1 which are separated from one another by means of blades 3.7 are shown in the right-hand region.

Figure 3H:
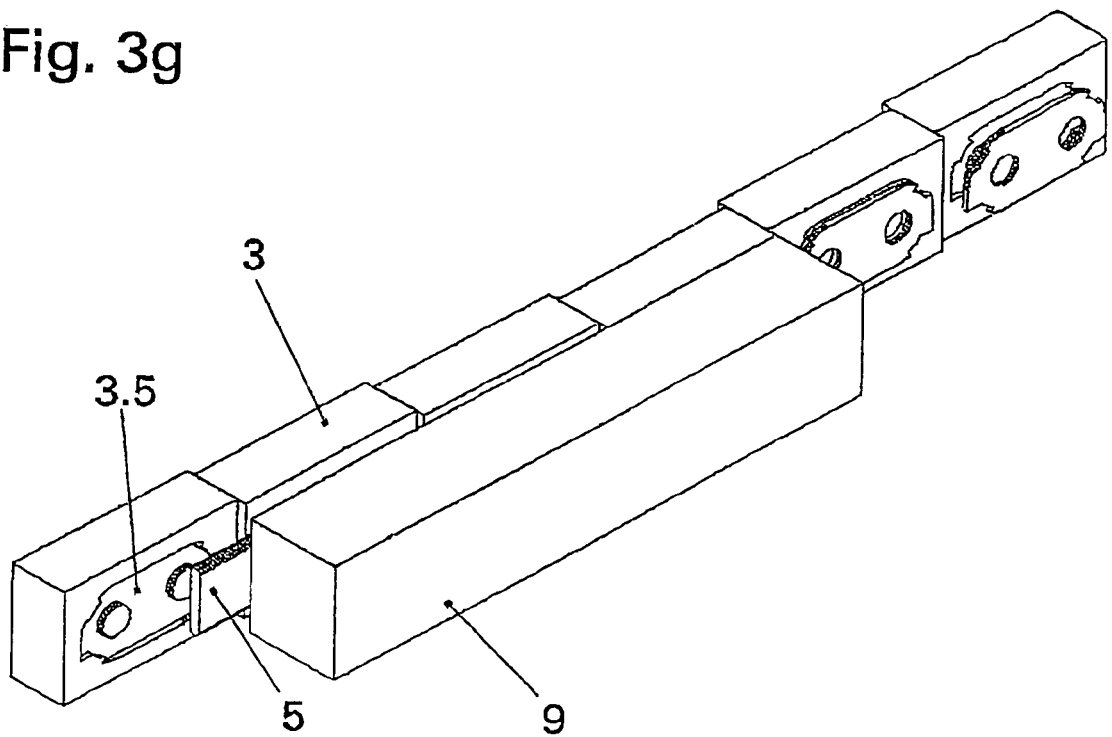

FIG. 3h shows a third embodiment of the device according to the invention. Here, according to FIG. 3g, the counterpart 9 assumes the function of the counterpart for the first dies 3 which act in the manner of a ram. These first dies 3 with their cavities 3.5 are configured in an analogous manner to FIG. 3c; here, however, the first dies 3 do not act as a mold for plastic which is to be injected, but as a ram-like press for pressing out the connecting elements 1 from the extruded material 5. One advantage of this third embodiment of the device according to the invention over the device which is shown in FIG. 3g consists of the fact that blades 3.7 can be omitted.

Figure 4:
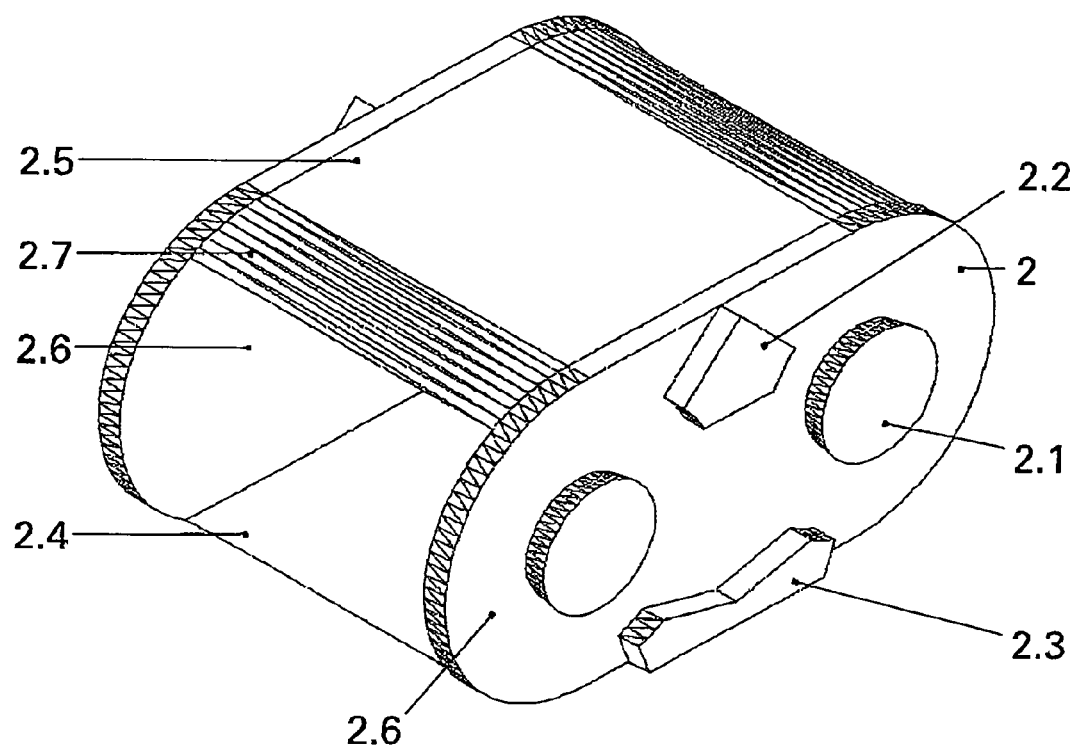

FIG. 4 shows one embodiment of a chain link 2. The chain link 2 is formed substantially in the shape of a hollow box in the injection molding process and has two parallel side walls 2.6 which are in each case of flat configuration. These side walls 2.6 are connected to one another by way of an upper web 2.5 and a lower web 2.4. The two ends of the side walls 2.6 are of approximately semicircular configuration. Approximately concentric pivots 2.1 are formed in the region of the semicircular ends 2.6. The pivots 2.1 are frustoconical, the diameter increasing away from the side wall 2.6. The conical configuration of the pivots 2.1 serves to form an undercut with the cutouts 1.1 of the connecting elements 1, with the result that, although the connecting elements 1 are connected rotatably to the chain links 2, the chain links 2 and the connecting elements 1 cannot be released from one another. In each case one lower stop 2.3 is arranged centrally on the outer side in the lower region of the side walls. In each case one upper stop 2.2 is arranged on the outside in the upper region of the side walls 2.6. The stops 2.2 and 2.3 serve, in an operative unit with the upper recesses 1.2 and the lower recesses 1.3 of the connecting elements 1, to delimit the rotation of the joints which are formed from cutouts 1.1 and pivots 2.1. Both the upper web 2.5 and the lower web 2.4 are configured with a rounded portion 2.7 in their end regions. These rounded portions 2.7 follow the external shape of the semicircular ends of the side walls 2.6.

As an alternative, it is possible to configure the chain links 2 in a U-shaped manner, that is to say open to the top or to the bottom without an upper web 2.4 or 2.5, or to configure at least one of the webs 2.5 or 2.4 to be capable of closure, such as being clipped.

Furthermore, it is possible as an alternative to configure the pivots 2.1 as an undercut with the cutouts 1.1 of the connecting elements 1, the connecting elements 1 likewise being connected rotatably to the chain links 2, but the chain links 2 and connecting elements 1 being releasable from one another, by the pivots 2.1 being configured such that they can be compressed elastically. For this purpose, it is possible, in particular, to configure the pivots 2.1 with at least one continuous groove, in a similar way to a deep slot of a screw head, or to configure spherical pivots 2.1 such that they can be clipped into and released from corresponding cutouts 1.1. A further advantage of spherically configured joints is, in particular in single-band chains, limited, additional lateral rollability of the chain and/or twistability of the chain.

Figure 5:
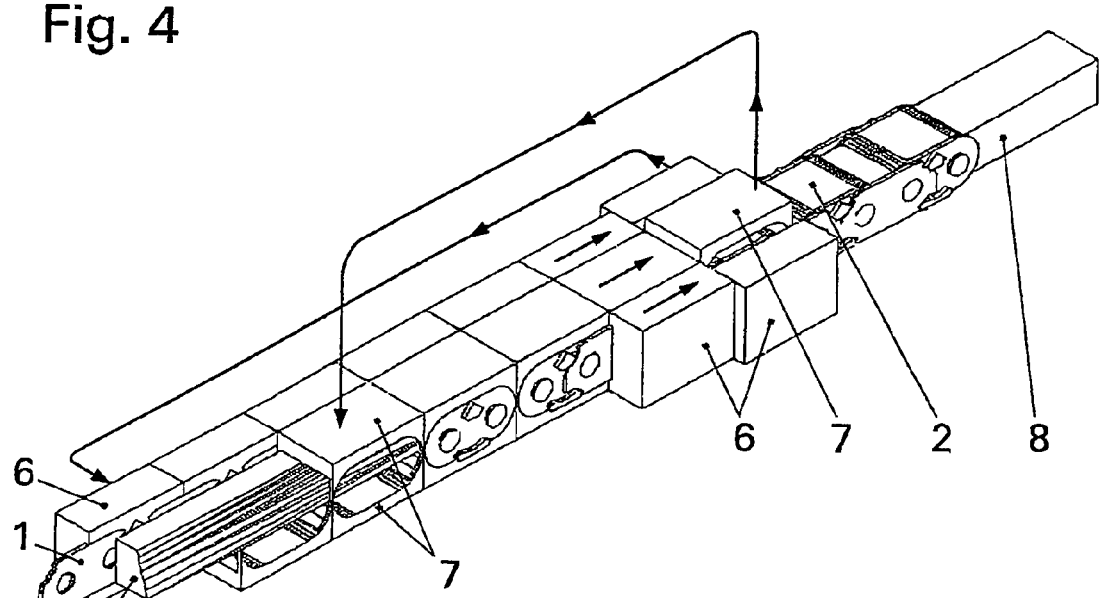
FIG. 5 shows a perspective view of a first embodiment of a device for producing said chain link.

FIG. 5 shows a first embodiment of a part of a device for the continuous production of connected chain links 2. To this end, finished connecting elements 1 are supplied. These connecting elements 1 are supplied on both sides, only the rear region in the manufacturing direction being shown on the right-hand side. The finished connecting elements 1 are inserted into receiving elements 6 laterally in each case in a manner which faces the inside and is arranged opposite one another. In each case two chain dies 7 are arranged in a corresponding manner above one another between in each case corresponding receiving elements 6, which chain dies 7 are guided together with the receiving elements 6 in the production direction, that is to say to the right in the illustration. A stationary core element 8 is arranged in the interior of the chain dies 7 which are arranged behind one another and in each case in a corresponding manner above and below. This stationary core element 8 is shown completely in the right-hand region of the illustration and approximately half of it is shown in the left-hand region of the drawing in a broken-open illustration. In each case two corresponding chain dies 7 which are arranged above one another and the receiving elements 6 which are arranged correspondingly next to the chain dies 7 form, in an operative unit with the core element 8, the mold for a chain link 2 which is to be injection molded. The connecting elements 1 which are inserted into the receiving elements 6 and the core element 8 are provided with a release agent. The release agent serves to prevent an adhesive bond between the liquid plastic, the liquid plastic which is injected into the hollow spaces which are formed by receiving elements 6 and chain die 7 in an operative unit with the core element 8 on one side and the connecting elements 1 and the dies 6, 7, 8 on the other side. The inlet openings for injecting the liquid, curable plastic are not shown. The device which is shown makes a continuous production process possible of an energy guiding chain; the receiving elements 6 which are fitted with connecting elements 1 are guided with the chain dies 7 first of all in parallel and in a manner which is sealed substantially to the outside with contact past the stationary core element 8. This section is shown with three parallel arrows. Here, the hollow mold which is formed from the abovementioned elements 6, 7 is filled with liquid, curable plastic under pressure. Subsequently, the plastic cures; here, the chain links 2 are formed which enter into an operative unit with the inserted connecting elements 1. Subsequently, the receiving elements 6 are guided away to the outside in accordance with the illustration of the system arrows; here, said receiving elements 6 are pulled laterally away from the finished energy guiding chain. Subsequently, the receiving elements 6 which are then emptied are fed again to the starting region (shown on the left-hand side) of the device and are fitted again with connecting elements 1 in such a way that their round, conical cutouts 1.1 of smaller diameter are always arranged toward the inner side of the device. The upper chain dies 7 are guided away to the top analogously to the receiving elements 6 in accordance with the illustration of the system arrows and the lower chain dies 7 are guided away to the bottom (this is not shown); here, said chain dies 7 are pulled off from the finished energy guiding chain to the top/bottom. Subsequently, the chain dies 7 which are then emptied are fed again to the starting region (shown on the left-hand side) of the device.

As an alternative, it is possible to cast metal, to sinter or to use ceramic, in order to fill the above-described mold and to produce the chain, instead of using liquid, durable plastic. Furthermore, it is possible to use different materials, in particular different plastics, for the production of a chain.

Figure 6A:
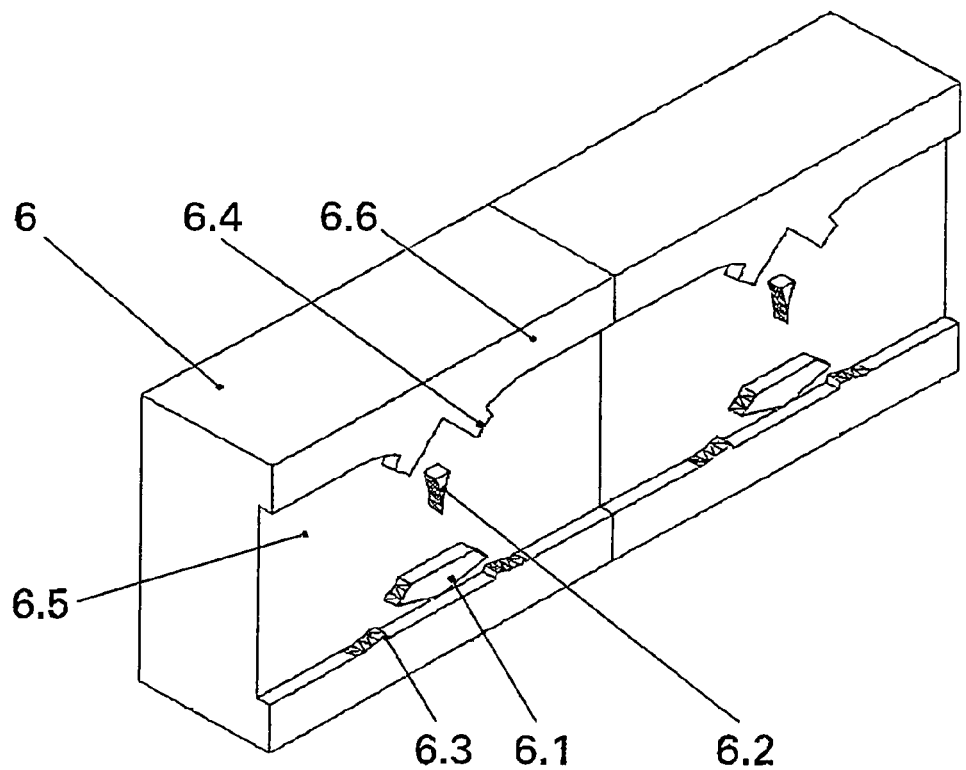
FIG. 6a shows a first detail of said device with one embodiment of receiving elements.

FIG. 6a shows a detail of the device according to FIG. 5. Here, two receiving elements 6 are shown. The receiving elements 6 have a flat inner face 6.6, in which in each case one cavity 6.5, likewise of flat configuration, is made. In each case a lower elevation 6.1 and an upper elevation 6.2 are arranged centrally in the cavity 6.5. Lower projections 6.3 are formed on the lower edge of the cavity 6.5 and in each case two upper projections 6.4 are formed on the upper edge of the cavity 6.5. As described under FIG. 5, the receiving elements 6 serve to receive connecting elements 1 and serve as lateral delimitation of an injection mold for the production of chain links 2. In order to receive the connecting elements 1, in each case one connecting element 1 is inserted centrally between two receiving elements 6.

Figure 6B:
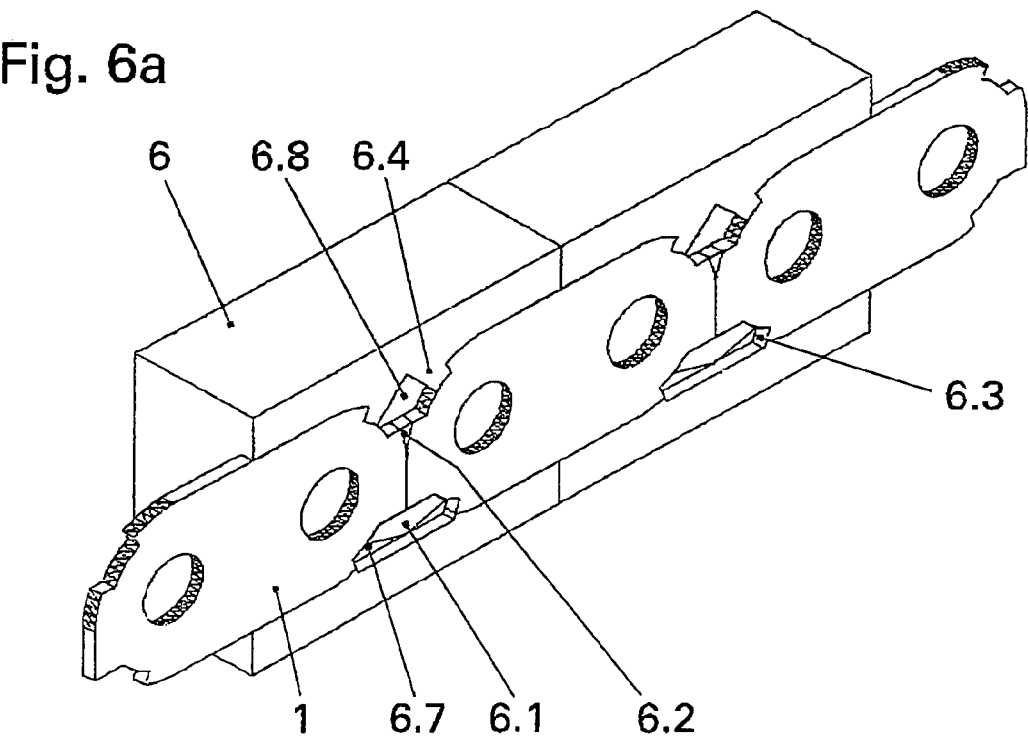
FIG. 6b shows said receiving elements with inserted connecting elements.

FIG. 6b shows the two receiving elements 6 according to FIG. 6a with inserted connecting elements 1. The lower projections 6.3 and the upper projections 6.4 serve to receive the connecting elements 1. The lower elevations 6.1 and the upper elevations 6.2 terminate by way of their surface with the inner face of the connecting elements 1 and serve later to avoid the injection of plastic into this region. An upper clearance 6.8 is formed by way of the upper projections 6.4 above the upper elevation 6.2, and in each case a lower clearance 6.7 is formed by the lower elevation 6.1, the lower projections 6.3 and the connecting elements 1 in the lower region of the joint between two connecting elements 1. The clearances 6.7 and 6.8 serve as a mold for the plastic which is to be injected, namely for the forming of the lower and upper stops 2.2 and 2.3 of the chain links 2. The cutouts 1.1 of the connecting elements 1 serve as a mold for those portions of the liquid plastic which are to be injected into these cutouts 1.1, with the result that the pivots (not shown here) of the chain links can be formed within the cutouts 1.1. The inner surface of the connecting elements which is shown in FIG. 6b and all elevations and cutouts are preferably provided with a release agent. This release agent serves to prevent a bond between plastic which is to be injected and the element which is shown, with the result that there is no adhesive bond between chain links and connecting elements later after the production of the chain links.

Figure 6C:
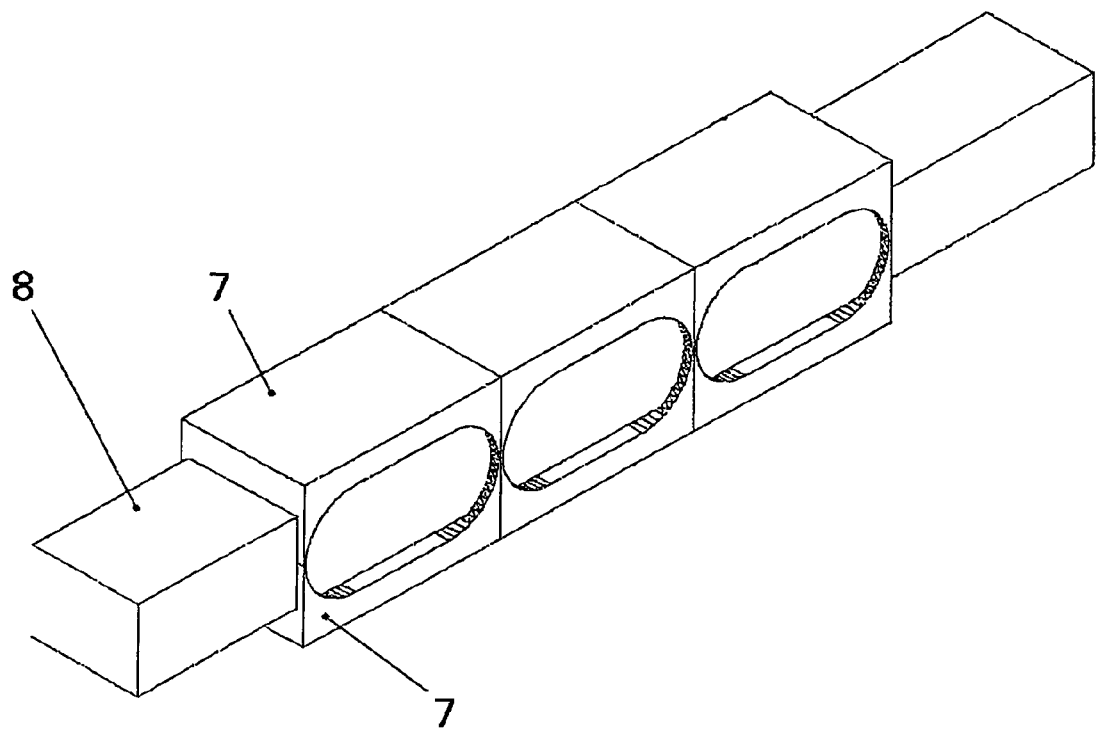
FIG. 6c shows a second detail of said device with chain dies.

FIG. 6c shows the region of the device according to FIG. 5, exclusively the chain dies 7 and the core element 8 being shown, in a perspective view.

Figure 6D:
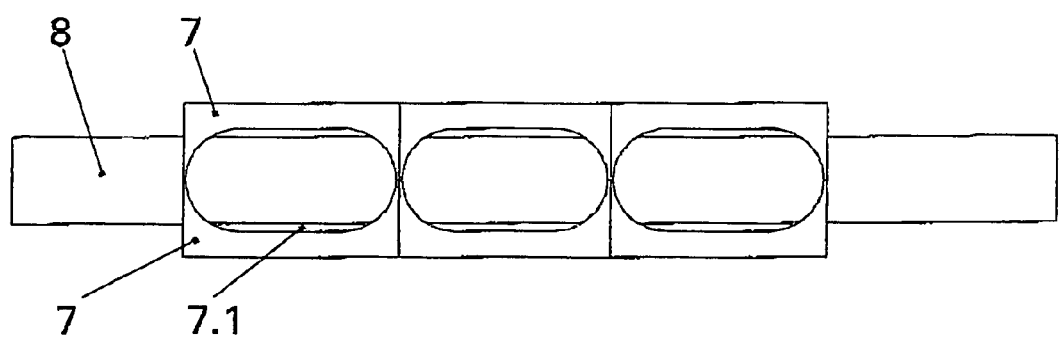
FIG. 6d shows this detail in a side view.

FIG. 6d shows a side view of FIG. 6c. First inner faces 7.1 of the chain dies 7 are formed in parallel to the lower and upper sides of the stationary core element 8. The chain dies 7 are arranged in each case in pairs so as to correspond with one another and are guided past the core element 8. The chain dies 7 are guided away in each case to the top and to the bottom at the end of the production direction. In that portion of the manufacturing method which is shown here, the chain dies 7 have not yet been guided away. The hollow space which is formed between the first inner faces 7.1 and the upper or lower sides of the core element 8 serves to form the lower webs 2.4 and the upper webs 2.5 of the chain links 2 (not shown here).

Figure 6E:
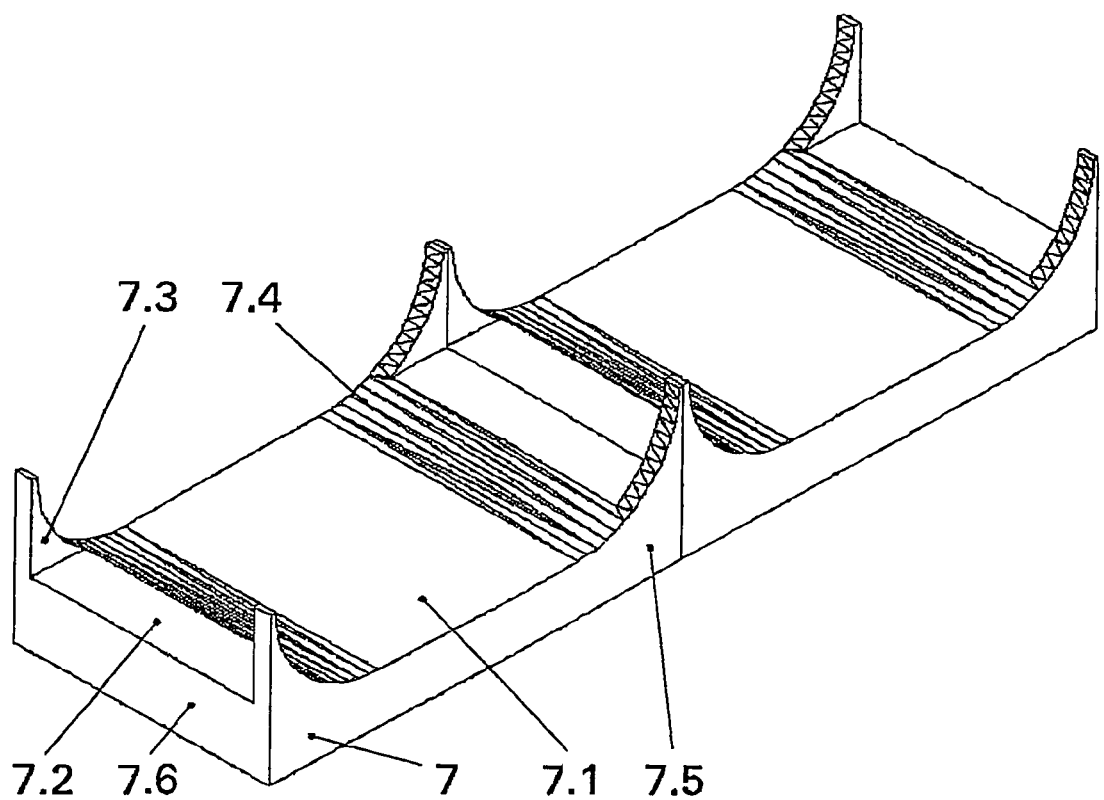
FIG. 6e shows two chain dies according to FIGS. 6c and 6d.

FIG. 6e shows two adjacent lower chain dies 7 without the corresponding upper chain dies 7. Each chain die 7 has the above-described flat first inner face 7.1 which merges into a rounded portion 7.4. Two second inner faces 7.2 which are likewise of flat configuration and extend in parallel to the first inner faces 7.1 are situated somewhat above the first inner face 7.1 at the ends of each chain die 7.

Each chain die 7 has four side walls 7.3, in each case one side wall 7.3 in one corner. Each side wall 7.3 assumes the profile of the rounded portion 7.4. The second inner faces 7.2 serve to slide on the underside of the core element 8. The arrangement of a plurality of chain dies behind one another and in a corresponding manner above the core element 8 with likewise corresponding receiving elements 6 which slide past the side faces of the core element 8 makes it possible to produce a moving injection mold which slides past the stationary core element 8 and by way of which the individual chain elements are injection molded which enter into an operative connection with connecting elements 1 which are inserted into the receiving elements 6, with the result that an energy guiding chain is produced in a continuous consecutive process, without additional forming, joining or other assembly work being required.

All the chains which are mentioned in the above-described figures are of two-band configuration, that is to say two corresponding connecting elements 1 are arranged at each end of a chain link 2. It is possible to connect the respectively corresponding connecting elements 1 to one another and to increase the torsional rigidity of said two-band chains as a result.

However, it is also possible to produce single-band chains, that is to say those chains, in which two adjacent chain links are connected by precisely one connecting element.

In addition, it is naturally likewise possible to configure multiple-band chains, that is to say those chains, in which chain links which are adjacent in the chain longitudinal direction are connected by two or more connecting elements.

The method according to the invention can be carried out continuously, that is to say conveying, drive or energy guiding chains of any desired length can be produced from injection molded profiles or extruded profiles of rectangular shape and/or box profile. No assembly operations are required. It is possible to produce the respective chain from a solid profile, with the result that, as viewed over the cross section, no weak points result at the edges or the transitions between the lower face, the upper face and the side faces.

The specified method steps for producing the individual chain links of a guide chain from extruded parts are not fixed substantially in their sequence, and can be rearranged in their sequence or be carried out at least partially at the same time. The sequence is variable because the chain links do not have to be separated during the method sequence, as the articulated connection is formed from the extruded part by the defined forming operations.

In relation to the chain links, a box profile is to be understood as any desired cross-sectional shape; for example, square, rectangular, round or oval shapes.

The pivots do not have to be of circular configuration; it is sufficient if they are of circular configuration in segments, with the result that they can be rotated within the openings 1.1 at least in segments. In this case, the joint itself can serve as a stop for delimiting a rotation.

The connecting elements 1 and the chain links 3 can be produced from materials which can be primarily formed or plastically formed, such as plastic and/or metal.

Furthermore, it is possible to first of all produce the chain links 2 and then subsequently to produce the connecting elements 1 by injection molding.

It is also possible, at the end of the production process, to separate elements of the chain, in particular adjacent connecting elements 1, by severing of a predetermined fracture point.

The invention claimed is:

1. A method for producing a chain having chain links and connecting elements, wherein the chain links have pivots and the connecting elements have a plurality of cutouts and the method comprises the steps of:
   inserting the connecting elements into cavities in receiving elements; and
   forming chain link pivots in the connecting element cutouts with injection moldable material.

2. A method for producing a chain having chain links and connecting elements wherein the connecting elements have a plurality of cutouts, and the chain links have a plurality of pivots; and the method comprises the steps of:
   forming the chain links in dies; and
   forming chain link pivots in connecting element cutout with injection moldable material.

3. The method according to claim 1, and further comprising the step of:
   applying a release agent to the connecting elements.

4. The method according to claim 1, wherein the cutouts are configured as an undercut.

5. The method according to claim 1, wherein the cutouts are undercut, and the pivots are frustoconical in shape.

6. The method according to claim 1, wherein the connecting elements are arranged in pairs on opposite sides of a chain link.

7. The method according to claim 1, wherein the step of forming chain link pivots in the connecting element cutouts is repeated to produce a chain of a predetermined length.

8. The method according to claim 1, and further comprising the step of:
   forming stops on the chain links for limiting the rotation between connecting elements and chain links.

9. The method according to claim 1, wherein the connecting elements are produced from plastic.

10. The method according to claim 1, wherein the connecting elements are produced by injection molding.

11. The method according to claim 1, wherein the chain links each include two pivots and the connecting elements each include two cutouts.

12. The method according to claim 1, wherein the chain links include four pivots and the connecting elements include two cutouts.

13. The method according to claim 1, wherein the receiving element cutouts are undercut and pivots are tapered in shape.

14. A method for producing a chain having chain links and connecting elements, wherein the connecting elements each have a plurality of cutouts, and the method comprises the steps of:
   inserting the connecting elements into cavities in receiving elements; and
   forming chain link pivots with injection moldable material in the connecting element cutouts, so that each pivot of a chain link is rotatable within a corresponding cutout in a connecting element.

15. A method for producing a chain having chain links and connecting elements wherein the connecting elements have a plurality of cutouts, and the chain links have a plurality of pivots, and the method comprises the steps of:
   forming a chain link in a die; and
   forming a chain link pivot in a connecting element cutout with injection moldable material, so that the pivot of the chain link is rotatable relative to the connecting element.

16. A method for producing a chain having chain links and connecting elements, wherein the connecting elements each have a plurality of cutouts and the method comprises the steps of:
   producing the connecting elements;
   inserting the connecting elements into cavities in receiving elements; and
   forming chain link pivots in the connecting element cutouts with an injection moldable material.

17. A system for a substantially continuous assembly of chain links and connecting elements, the system comprising:
   a starting region and an ending region;
   a plurality of movable receiving elements disposed between the starting region and the ending region, and the movable receiving elements define cavities for receiving connecting elements; and
   a plurality of chain dies disposed between the starting region and the ending region, and the chain dies define with corresponding receiving elements, a hollow space for forming chain link material into a chain link.

18. The system according to claim 17, wherein the movable receiving elements are spaced apart a distance equal to a width of the chain dies and define a hollow space with the chain dies for the production of chain links.

19. The system according to claim 18, and further comprising:
   a core element arranged in the hollow space to define an inner space when forming the chain links.

20. The system according to claim 17, and further comprising:
   a release agent applicator disposed in the starting region to apply a release agent to the connecting elements.

21. The device system according to claim 17, and further comprising:
   a chain receiving guide positioned in the ending region.

22. The system according to claim 17, and further comprising:
   a connecting element die positioned before the starting region.

23. The system according to claim 17, and further comprising a fitter positioned in the starting region for assembling the receiving elements with connecting elements.

* * * * *